US012665360B2

(12) United States Patent
Sun et al.

(10) Patent No.: US 12,665,360 B2
(45) Date of Patent: Jun. 23, 2026

(54) SENSOR CONNECTORS

(71) Applicant: NATIONAL RESEARCH COUNCIL OF CANADA, Ottawa (CA)

(72) Inventors: Zhigang Sun, Greenfield Park (CA); Tony Vaillancourt, Saint-Jean-sur-Richelieu (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 303 days.

(21) Appl. No.: 18/689,004

(22) PCT Filed: Sep. 2, 2022

(86) PCT No.: PCT/CA2022/051328
§ 371 (c)(1),
(2) Date: Mar. 4, 2024

(87) PCT Pub. No.: WO2023/028713
PCT Pub. Date: Mar. 9, 2023

(65) Prior Publication Data
US 2024/0372305 A1     Nov. 7, 2024

Related U.S. Application Data

(60) Provisional application No. 63/240,609, filed on Sep. 3, 2021.

(51) Int. Cl.
*H01R 24/54*          (2011.01)
*G01H 11/08*          (2006.01)
(Continued)

(52) U.S. Cl.
CPC ........... *H01R 24/542* (2013.01); *G01H 11/08* (2013.01); *H01R 4/023* (2013.01); *H01R 13/2414* (2013.01); *H01R 2103/00* (2013.01)

(58) Field of Classification Search
CPC .. H01R 24/542; H01R 4/023; H01R 13/2414; H01R 2103/00; G01H 11/08
See application file for complete search history.

(56) References Cited

U.S. PATENT DOCUMENTS 3,543,065 A     11/1970  Phelan
6,280,214 B1 *  8/2001   Chang .................... H01R 29/00
                                                  200/51.1
(Continued)

FOREIGN PATENT DOCUMENTS

CN         1154545 C        6/2004
CN      112993629 A  *  6/2021  ........... H01R 12/737
(Continued)

OTHER PUBLICATIONS

European Patent Office Supplementary Partial Search Report for Application No. 22862481 dated May 22, 2025 (3 pages).
(Continued)

*Primary Examiner* — Francis C Gray
(74) *Attorney, Agent, or Firm* — Michael Best & Friedrich LLP

(57)          ABSTRACT

A coupler for coupling an RF connector to an ultrasound sensing element. The coupler includes a conductive coupler body with a first end and a second end. The first end includes a pad retaining recess with a compressible conductive pad positioned in and protruding from the pad retaining recess. The second end either includes an opening for receiving a male pin of a radio frequency (RF) connector or is shaped to be press-fitted into the female pin opening of an RF connector, to conductively connect the pin with the coupler body. A sensor connector is also disclosed.

21 Claims, 16 Drawing Sheets

(51) Int. Cl.
*H01R 4/02* (2006.01)
*H01R 13/24* (2006.01)
*H01R 103/00* (2006.01)

(56) References Cited

U.S. PATENT DOCUMENTS

| | | | | |
|---|---|---|---|---|
| 7,841,906 B2 * | 11/2010 | Dent | .................... | H01R 13/187 |
| | | | | 439/675 |
| 10,234,375 B2 | 3/2019 | Abdellatif et al. | | |
| 2007/0222428 A1 | 9/2007 | Garvin et al. | | |
| 2014/0199895 A1 * | 7/2014 | Chui | .................. | H01R 13/2421 |
| | | | | 439/824 |
| 2018/0006398 A1 * | 1/2018 | Cuban | .................... | H01R 24/54 |

FOREIGN PATENT DOCUMENTS

| | | | | | |
|---|---|---|---|---|---|
| WO | WO-2011047272 A2 * | 4/2011 | ............. | H01R 24/42 |
| WO | 2018032106 A1 | 2/2018 | | |

OTHER PUBLICATIONS

International Patent Office Search Report and Written Opinion for Application No. PCT/CA2022/051328 dated Dec. 8, 2022 (8 pages).

* cited by examiner

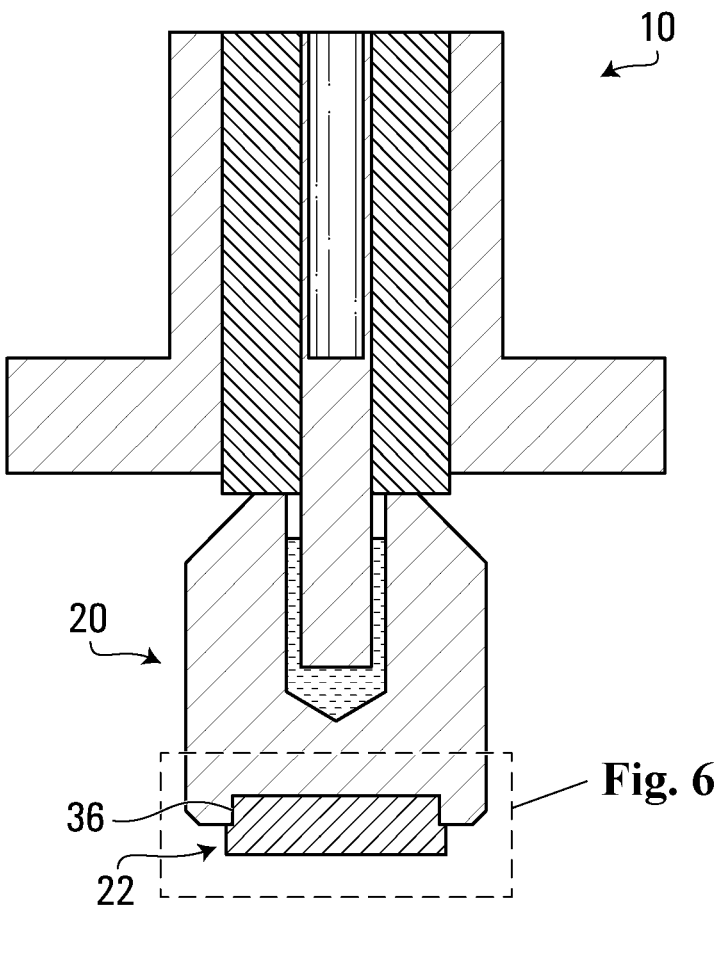
10
20
36
22
Fig. 6
FIG. 5
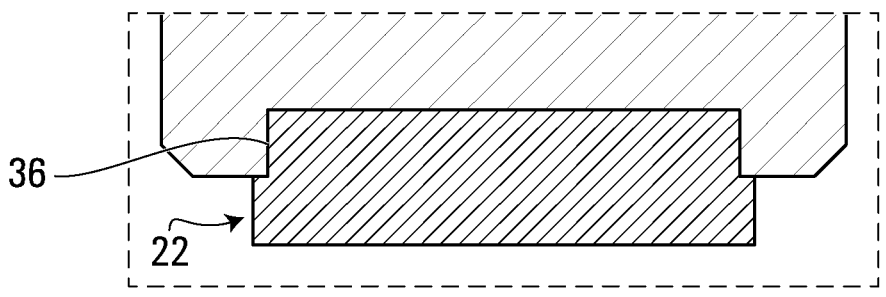
36
22
FIG. 6

SENSOR CONNECTORS

FIELD

This application relates generally to sensor connectors and, in particular, to sensor connectors for connecting an ultrasound sensing element to a coaxial cable.

BACKGROUND

Ultrasound sensors are used to excite and detect ultrasonic waves. In a typical ultrasound sensor, the sensing element is a piezoelectric plate with an electrically conductive layer (electrode) coated or deposited on each of the bottom and top faces.

Such ultrasound sensors may be used in a wide variety of applications. For example, ultrasound sensors may be used in rock bolt condition monitoring. International Patent Application Publication No. WO2018032106, entitled METHODS AND SYSTEMS FOR ULTRASONIC ROCK BOLT CONDITION MONITORING, which is hereby incorporated herein in its entirety by reference, describes, among other things, sensor connectors for connecting to assets to be monitored using ultrasound sensors. While these connectors perform well, there is a desire to find improved ways of connecting leads to the electrodes of the sensing element (piezoelectric plate) easily, reliably and cost-effectively in harsh environments, such as mining environments.

SUMMARY

In one aspect of the present disclosure, there is provided a coupler for coupling an RF connector to an ultrasound sensing element, the coupler comprising a conductive coupler body with a first end and a second end, wherein the first end comprises a pad retaining recess with a compressible conductive pad positioned in and protruding from the pad retaining recess, and wherein the second end either comprises an opening for receiving a male pin of a radio frequency (RF) connector or is shaped to be press-fitted into the female pin opening of an RF connector, to conductively connect the pin with the coupler body.

In another aspect of the present disclosure, there is provided a sensor connector comprising: an RF connector connected to a coupler as described herein, wherein a pin of the RF connector is conductively connected to the coupler body.

In another aspect of the present disclosure, there is provided a sensor connector for an ultrasound sensor, the connector comprising a conductive shell surrounding an insulative sleeve, and a conductive plunger positioned in the sleeve without conductive contact between the plunger and the shell, the plunger comprising a pad retaining recess with a compressible conductive pad positioned in and protruding from the pad retaining recess.

In another aspect of the present disclosure, there is provided a sensor head comprising: a sensor connector as described herein, and a conductive adaptor connected to the sensor connector, wherein the adaptor forms a conductive connection with the shell of the sensor connector without a conductive connection with the pad of the sensor connector.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings:

FIG. 5 is a further cross-sectional view of the sensor connector of FIG. 3.

FIG. 6 is an enlarged view of a portion of the sensor connector as indicated in FIG. 5.

DETAILED DESCRIPTION

Previously disclosed sensor connectors use electrically conductive adhesive to bond a compressible conductive pad to a conductive plunger, which in turn is connected to wiring. The pad may be pressed against the sensing element to form a connection. However, the adhesive material may degrade or undergo a chemical reaction with the conductive pad and the sensing element, resulting in degradation or loss of sensing signals.

Other previously disclosed sensor connectors involved a high number of complex components, which may be costly to manufacture and likelier to fail in the field.

Embodiments of sensor connectors according to the present disclosure, may have significantly reduced material and fabrication costs as compared to prior art sensor connectors and may be less complex, ensuring a longer and more reliable life. Embodiments of the present disclosure include couplers that may be combined with a commercially available Radio Frequency (RF) connector to form a sensor connector, as well as single-unit sensor connectors. Embodiments of sensor heads using a sensor connector described herein are also disclosed.

Figure 1:
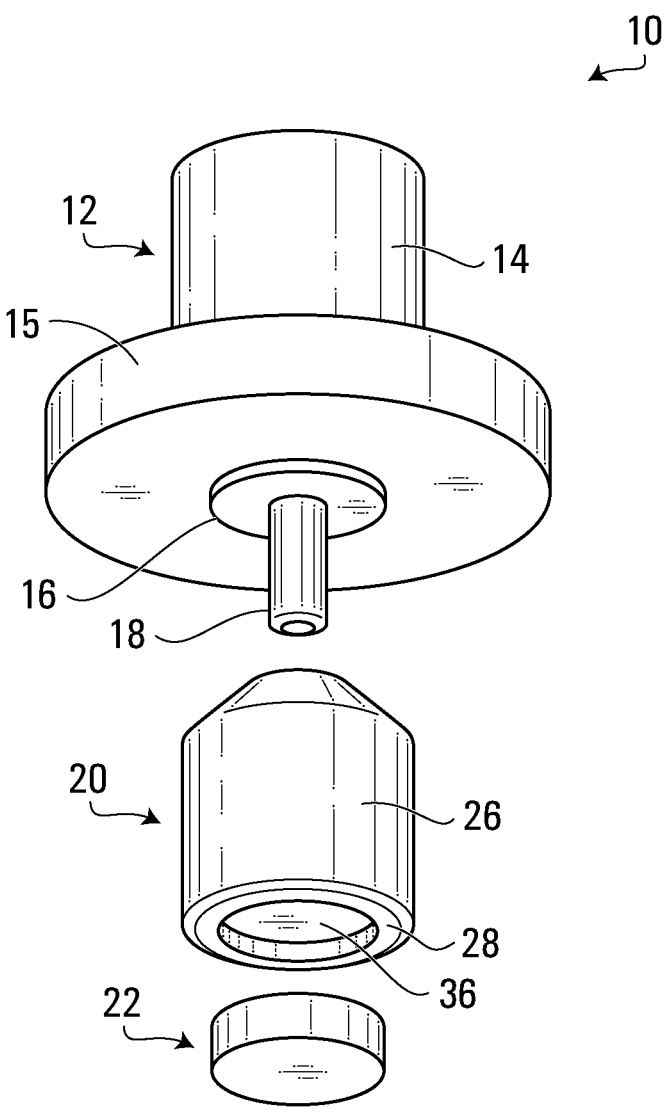
FIG. 1 is an exploded view of a sensor connector according to one embodiment of the present disclosure.
Figure 2:
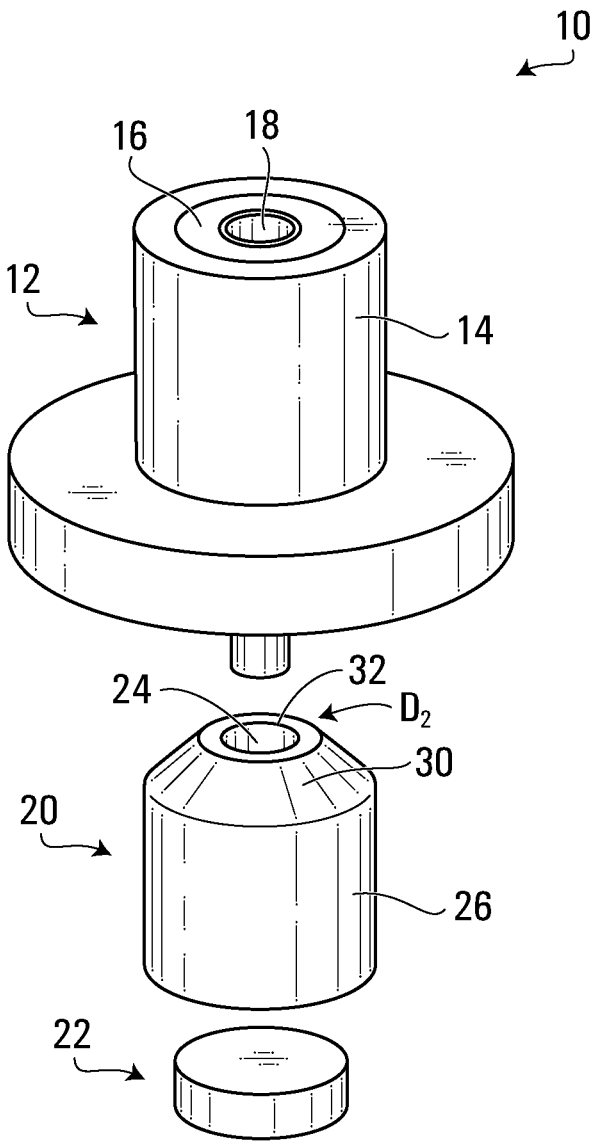
FIG. 2 is another exploded view of the sensor connector of FIG. 1.

FIGS. 1 and 2 illustrate exploded views of an embodiment of a sensor connector 10 according to the present disclosure.

RF connector 12 is a generic representation of a variety of male RF connectors with a central round pin or post conductor. Mounting details of the RF connector 12 such as thread, number and dimensions of screw holes etc. may vary and may depend on a number of factors. The RF connector 12 has an outer electrically conductive shell 14, an electrical insulative sleeve 16, and an electrically conductive pin conductor 18, also referred to as a centre conductor.

The shell 14 and centre conductor 18 are electrically insulated from one another due to the insulative sleeve 16, which may run along the entire interior length of the shell 14, which is generally cylindrical. In addition to the RF connector 12, the sensor connector 10 also comprises an electrically conductive coupler 20 and a compressible, electrically conductive pad 22.

The shell 14 is generally cylindrical and includes a connecting portion 15, such as a flange, connection plate, or other like structure, that extends laterally from the shell 14 and is conductively connected to the shell 14. For example, the connecting portion 15 may be a plate with screw holes integrally formed with the shell 14.

The centre conductor 18 is received within a corresponding and complementary bore 23 within the coupler 20 with an opening 24. The centre conductor 18 includes a hollow portion 25 extending through the insulative sleeve 16 from the conductor 18 towards an end of the sleeve 16 for receiving and coupling to a lead wire.

Figure 3:
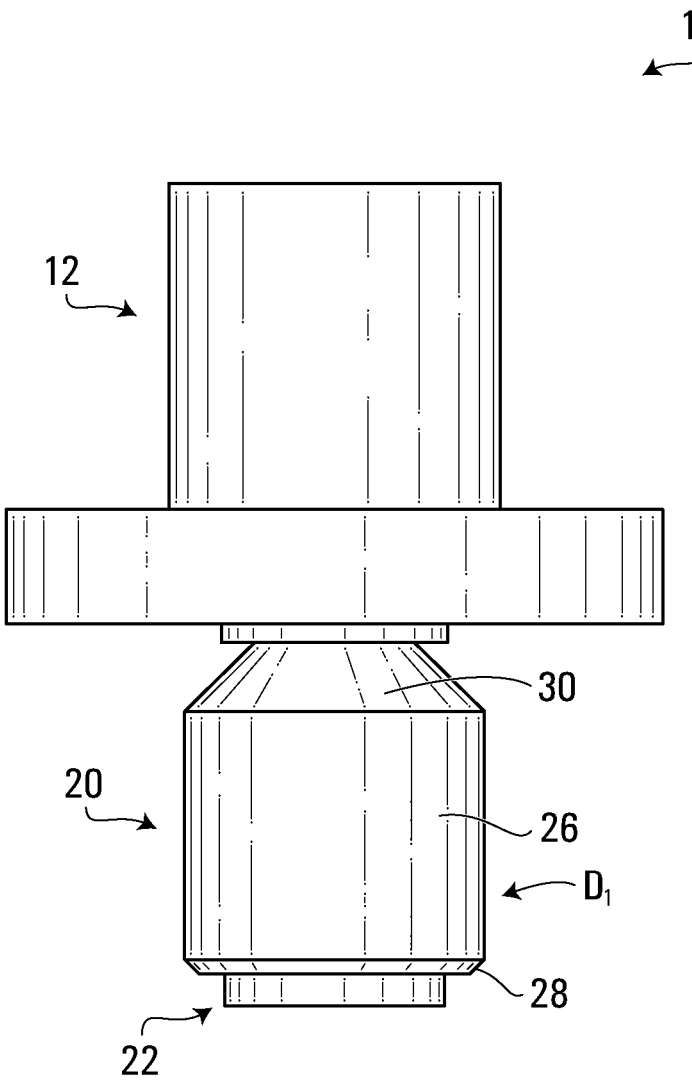
FIG. 3 is an assembled view of the sensor connector of FIG. 2.

Referring to FIGS. 2 and 3, in the illustrated embodiment, the coupler 20 has a generally cylindrical body 26 with a first diameter $D_1$ and a first end 28. Opposite the first end 28, the coupler 20 has a tapered or frusto-conical portion 30 that narrows the diameter of the coupler 20 from the diameter $D_1$ to a second diameter $D_2$ surrounding the opening 24. The second diameter $D_2$ is sized so that a second end 32 of the coupler 20 contacts the insulative sleeve 16 when the centre conductor 18 is received in the coupler 20 to avoid conductive contact between the coupler 20 and the shell 14 of the RF connector 12.

Figure 4:
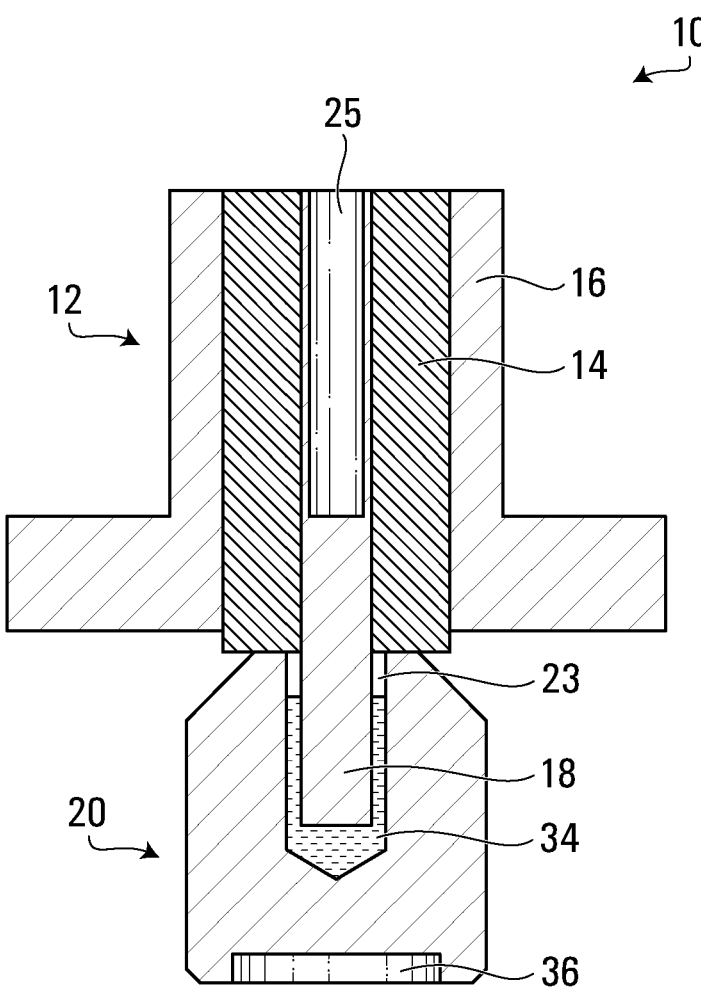
FIG. 4 is a cross-sectional view of the sensor connector of FIG. 3.

As shown in FIG. 4, when assembled, the bore 23 includes an adequate amount of a reflow solder paste 34 which receives the centre conductor 18. This aids in ensuring a conductive connection between the centre conductor 18 and the coupler body 26.

Following insertion of the centre conductor 18 into the solder paste 34, the two parts are heated according to a reflow temperature profile of the solder paste 34 and joined together after solidification of the solder paste 34. The solder paste 34 and the material of the insulative sleeve 16 are selected in such a way that the reflow process does not impact the integrity of the insulative sleeve 16 during heating. This process may allow a plurality of sensor connectors 10 to be reflowed in batch for higher productivity.

At the first end 28, the coupler body 26 includes a cavity 36 sized to receive the pad 22. The cavity 36 is undersized as compared to the pad to retain the pad in place. In particular, in the illustrated embodiment shown in FIG. 6, the cavity 36 is round and has a diameter less than a diameter of the pad 22 to help ensure that the pad 22 is held in place with a press fit. Similarly, a depth of the cavity 36 is less than a depth of the pad 22 to help ensure that the pad protrudes from the cavity 36.

Cavity 36 and pad 22 may be sized and dimensioned in such a way that, after the pad 22 is pushed into the cavity 36, the squeezing force exerted by the cavity lateral boundary to upper portion of the pad 22 is strong enough to hold the pad 22 without the latter falling off easily during transportation and installation of the sensor connector 10 (or sensor heads discussed below).

Retaining the pad 22 in this manner, may aid in avoiding the use of adhesive, not only possibly enabling easy electrical connection between conductive pad 22 and cavity 36, but also eliminating complications associated with using adhesives (material degradation, chemical reaction, higher electrical resistivity, higher cost, longer fabrication time, etc.).

Figure 7:
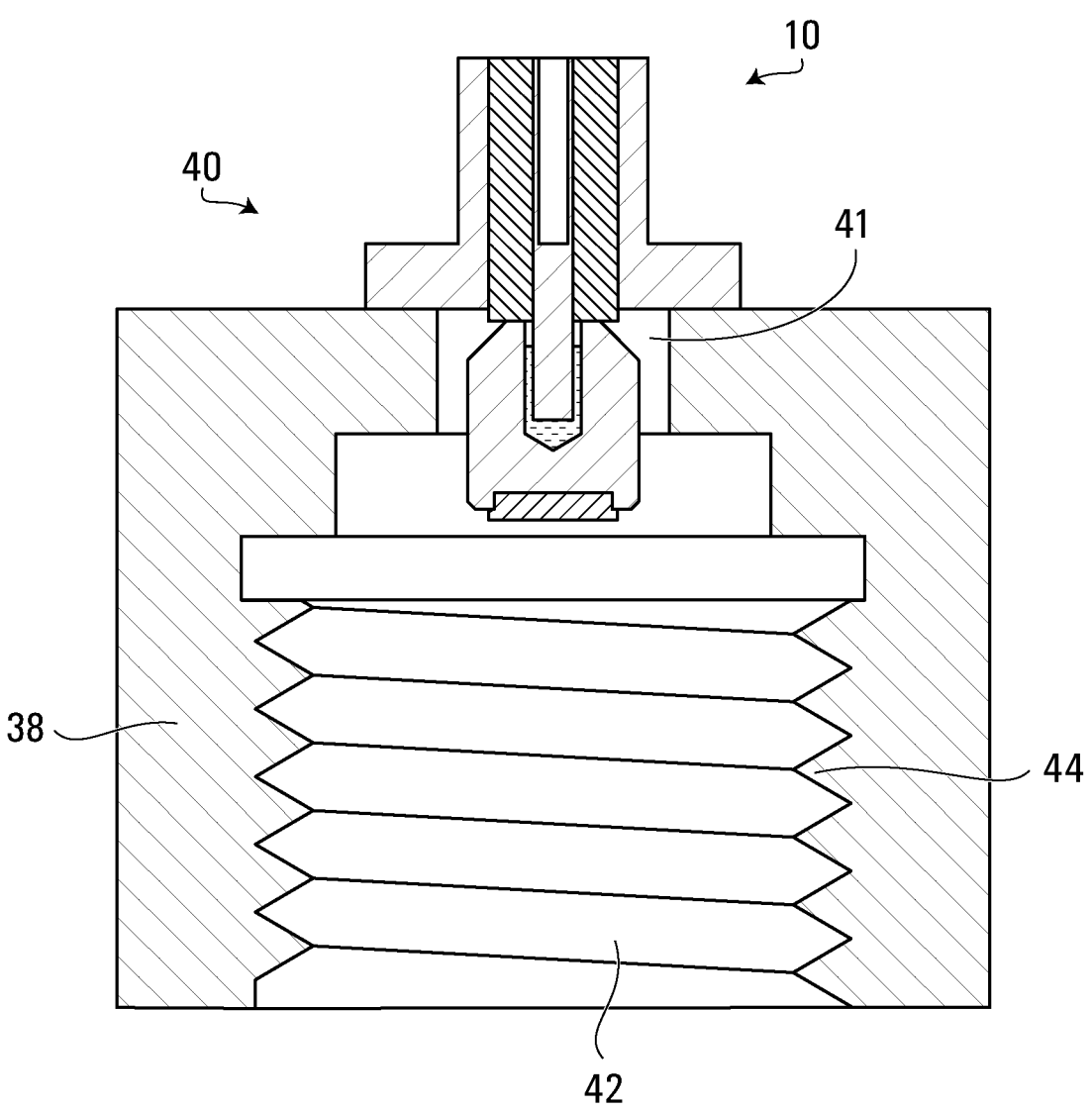
FIG. 7 is a cross-sectional view of a sensor head according to embodiments of the present disclosure.
Figure 8:
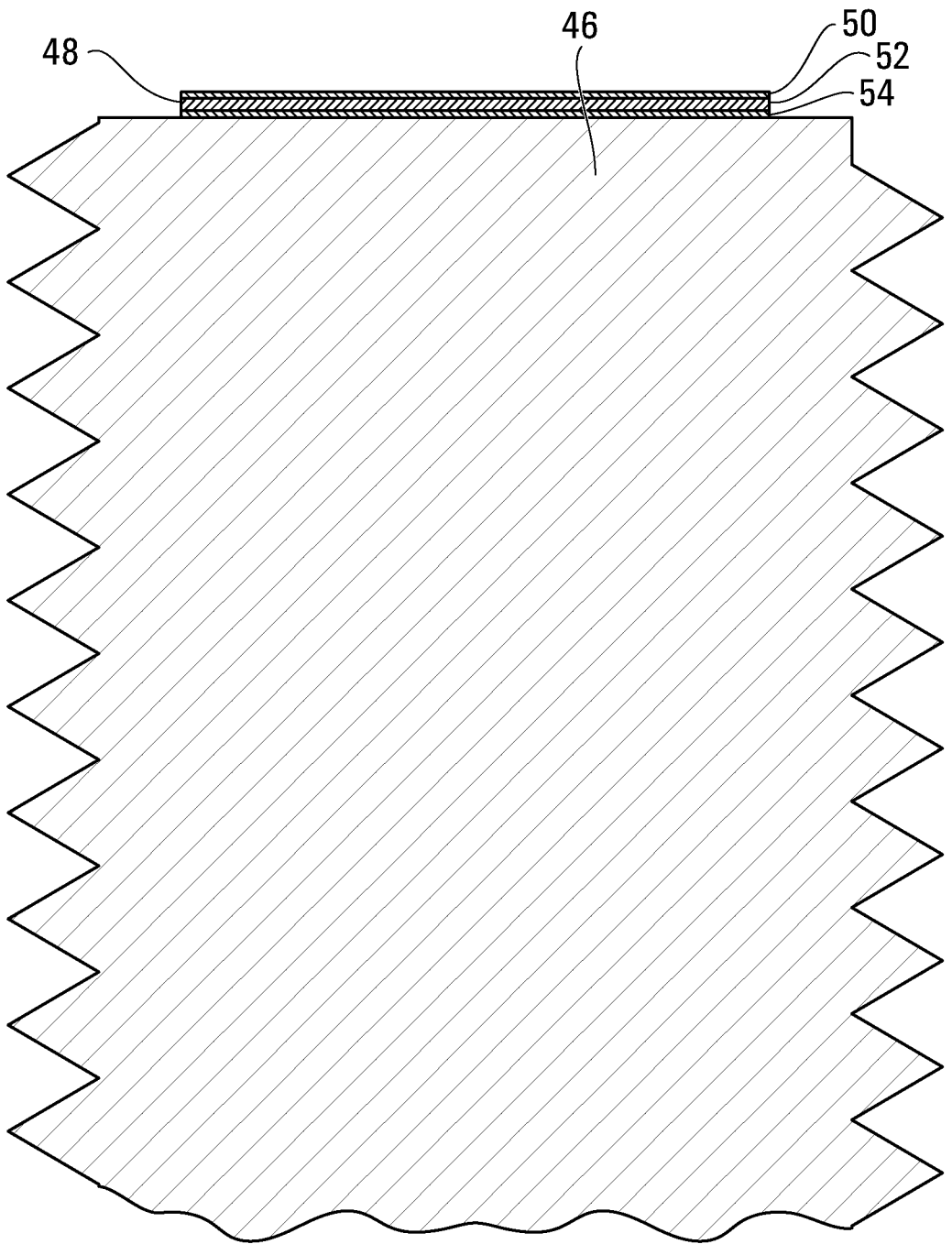
FIG. 8 is a cross-sectional view of a sensing element connected to an asset.

Referring to FIGS. 7 and 8, in some embodiments, the sensor connector 10 may be affixed to an electrically conductive adaptor 38 to form a sensor head 40 using, for example, suitable fasteners (not shown) that extend through the connecting portion 15.

The sensor connector 10 extends through an opening 41 of the sensor head 40 such that the pad is positioned on an opposite side of the opening 41 from a lead to be coupled to the sensor connector.

The adaptor 38 may have an interior cavity 42 with interior thread 44 for threading the sensor head 40 onto an electrically conductive asset 46, for example, a rock bolt head. The sensor connector 10 and adaptor 38 are configured such that the pad 22 is positioned within the cavity 42. When threaded onto the asset 46, contact is made between the pad 22 and a sensing element 48 fixed to the asset 46.

The sensing element 48 may be composed of a top electrode 50, a piezoelectric plate 52, and a bottom electrode 54. The sensing element 48 may be bonded to the surface of the asset 46 with help of an adhesive that maintains a good electric and acoustic contact between the bottom electrode 54 and the asset 46.

Figure 9:
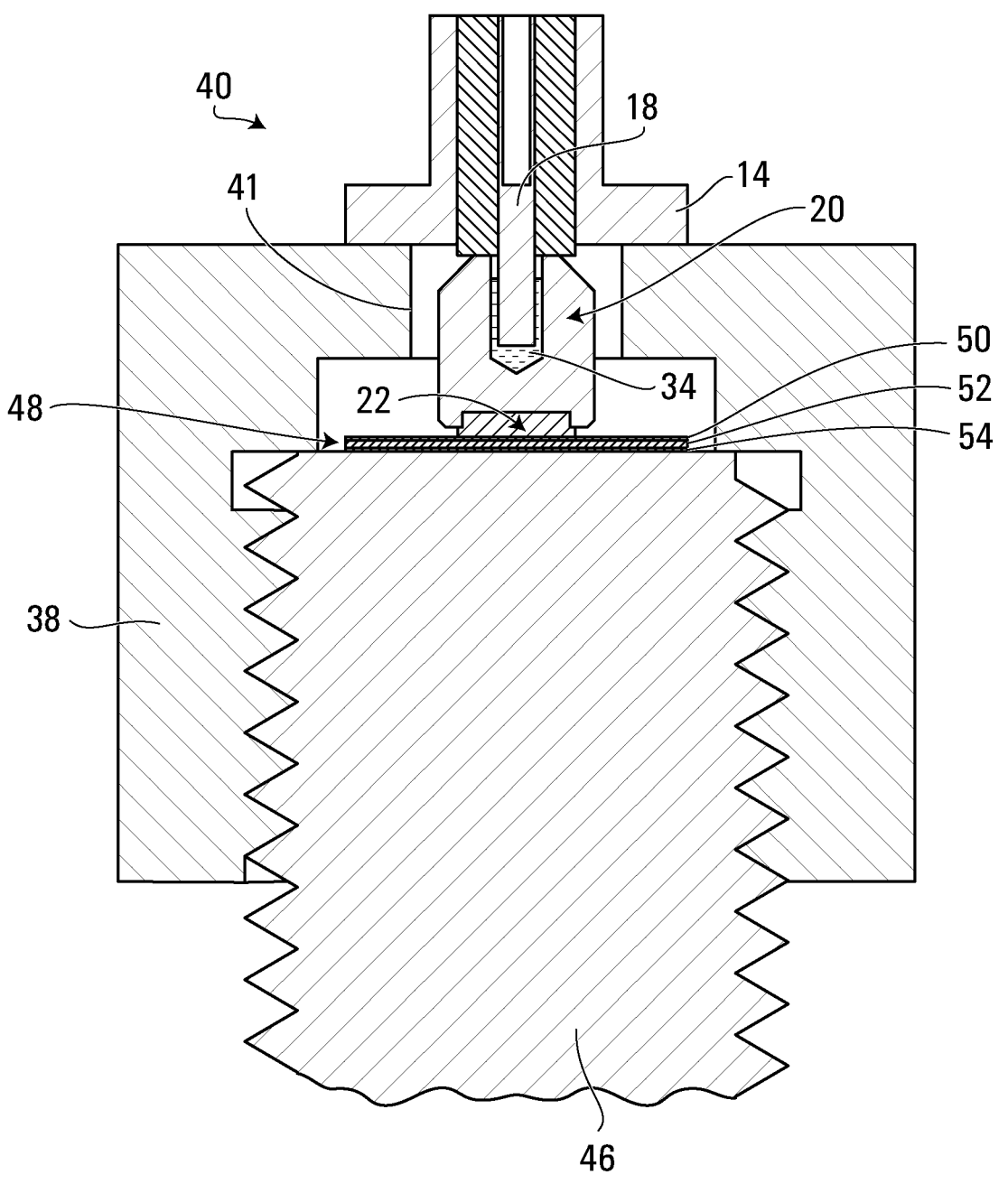
FIG. 9 is a cross-sectional view of a sensor head coupled to the asset of FIG. 8.

In practice, the sensor head 40 is to be attached to the asset 46 with suitable means. An example embodiment is illustrated in FIG. 9 in which the sensor head 40 is threaded onto the threaded extremity of a cylindrical asset 46, such as a rock bolt head.

The sensor head 40 is sized and dimensioned such that, after installation, the conductive pad 22 is compressed against the top electrode 50 of the sensing element 48 to maintain a suitable electric contact and such that the adaptor 38 is not in direct contact with the sensing element 48 and the coupler 20.

The top electrode 50 of the sensing element 48 is electrically connected to the centre electrode 18 of the connector 10 through the conductive pad 22, the conductive coupler 20 and the conductive solder 34. The bottom electrode 54 of the sensing element 48 is electrically connected to the conductive shell 14 of the RF connector 12 through the conductive asset 46 and the conductive adaptor 38.

The conductive shell 14 and the centre conductor 18 can be produced of a variety of conductive materials, including metals. The insulative sleeve 16 can be produced of a plastic or other insulative material. The compressible conductive pad 20 may be produced of a variety of materials, including a conductive rubber.

Figure 10A:
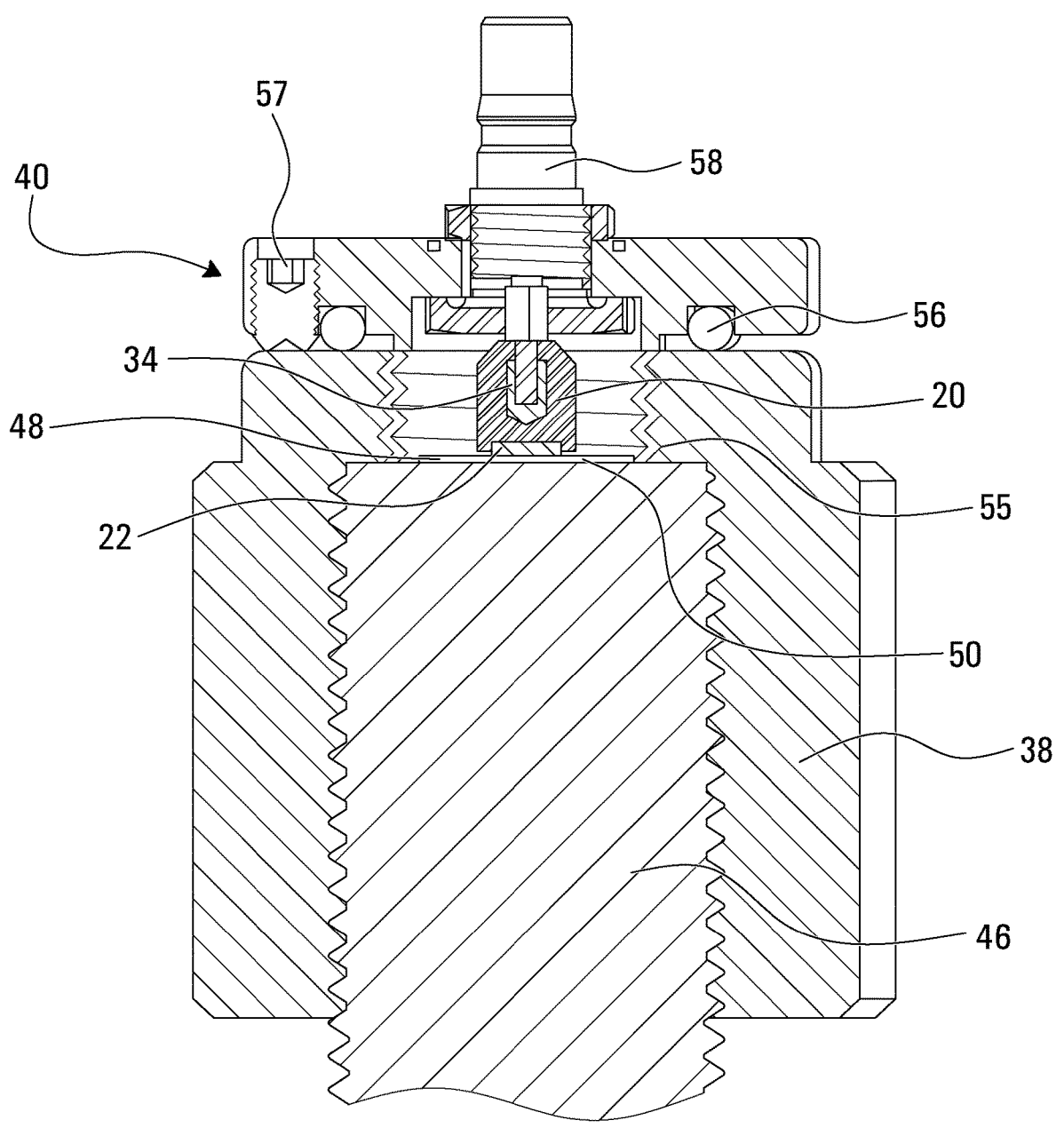
FIG. 10A is a cross-sectional view of a sensor head coupled to the asset of FIG. 8 according to another embodiment of the present disclosure.

FIG. 10A is a cross-sectional view of a sensor head 40 coupled to the asset of FIG. 8 according to another embodiment. The sensor head 40 is attached to the asset 46 with the means of a threaded opening 55 of a conductive adaptor 38. The sensor head is sized and dimensioned such that, after installation, the conductive pad 22 is compressed against the top electrode 50 of the sensing element 48 to maintain a suitable electric contact and such that the adaptor 38 is not in direct contact with the sensing element 48 and the coupler 20. A rubber O-ring 56 is adequately compressed to provide a water-resistant seal between the head 40 and the adaptor

Figure 10B:
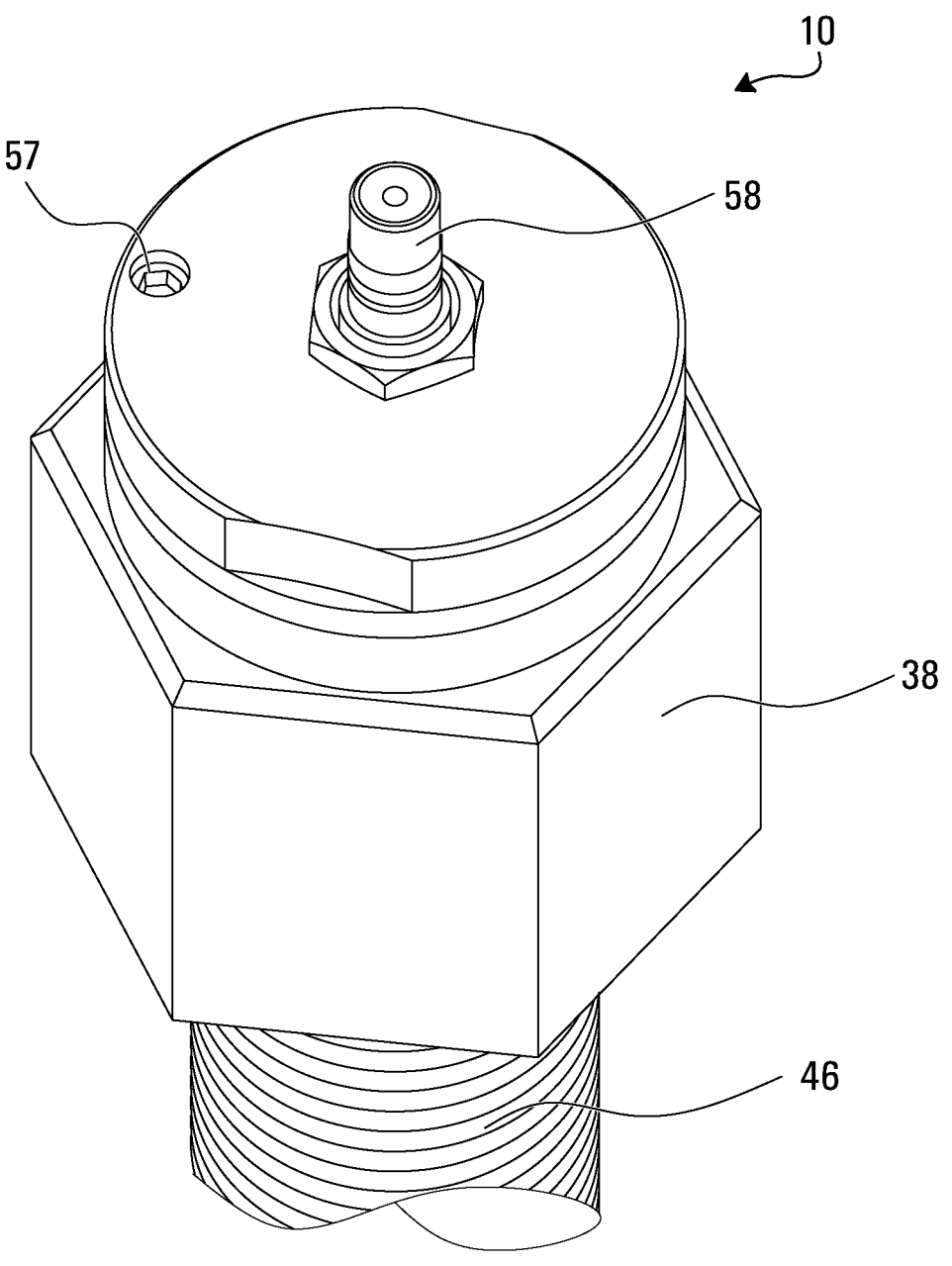
FIG. 10B is a perspective view of the sensor head of FIG. 10A.

38. A set screw 57 is used to secure the sensor head 40 in place. For illustration purpose a QMA RF connector 58 is illustrated, it being understood that the embodiment is applicable to other types of RF connectors as well. FIG. 10B is a perspective view of the sensor head 40 of FIG. 10A.

Figure 11:
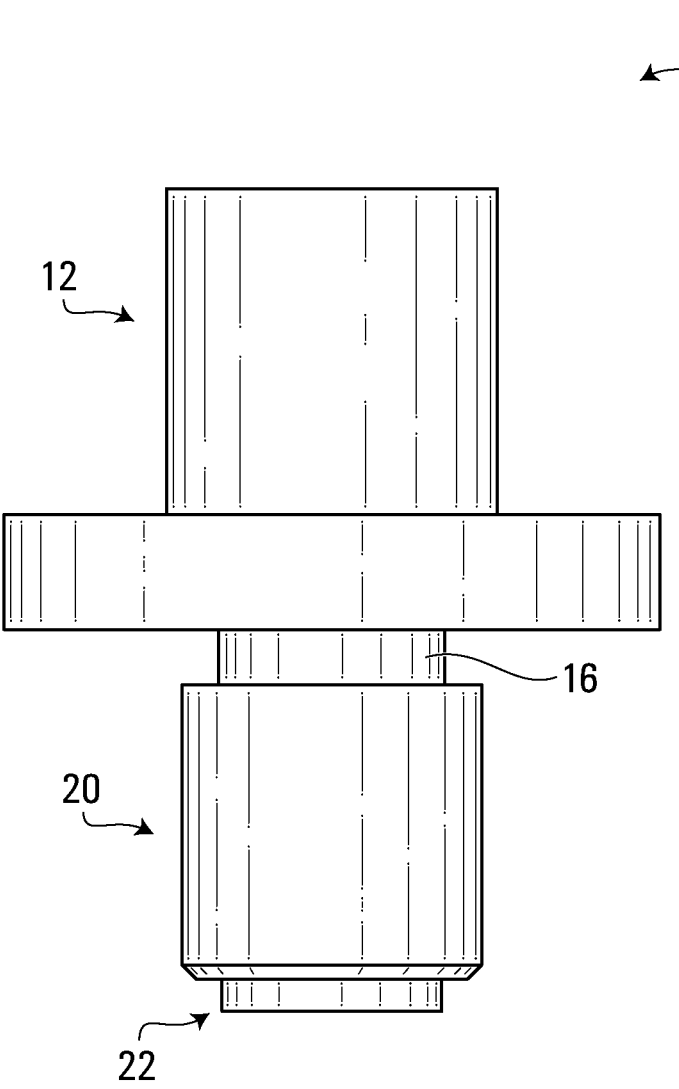
FIG. 11 is a side view of a sensor connector according to another embodiment of the present disclosure.
Figure 12:
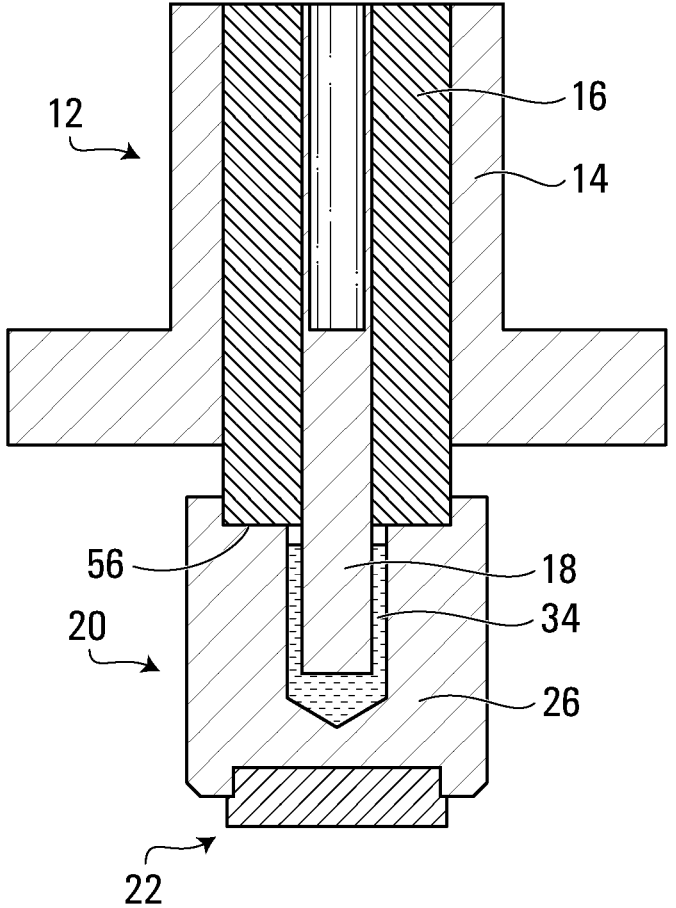
FIG. 12 is a cross-sectional view of the sensor connector of FIG. 11.

Other embodiments are possible. Referring to FIGS. 11 and 12, another embodiment of a sensor connector 10 is disclosed. Such an embodiment may be used to accommodate a longer insulative sleeve 16 that protrudes from the RF connector 12. Specifically, in the illustrated embodiment, the tapered portion 30 is omitted and, at the second end 32, the coupler body 26 includes a recess 56 surrounding opening 24 sized to receive a portion of the protruding insulative sleeve 16. The recess 56 is sized, in particular a depth of the recess 56 is sized, such that the coupler body 26 avoids contact with the conductive shell 14.

Figure 13:
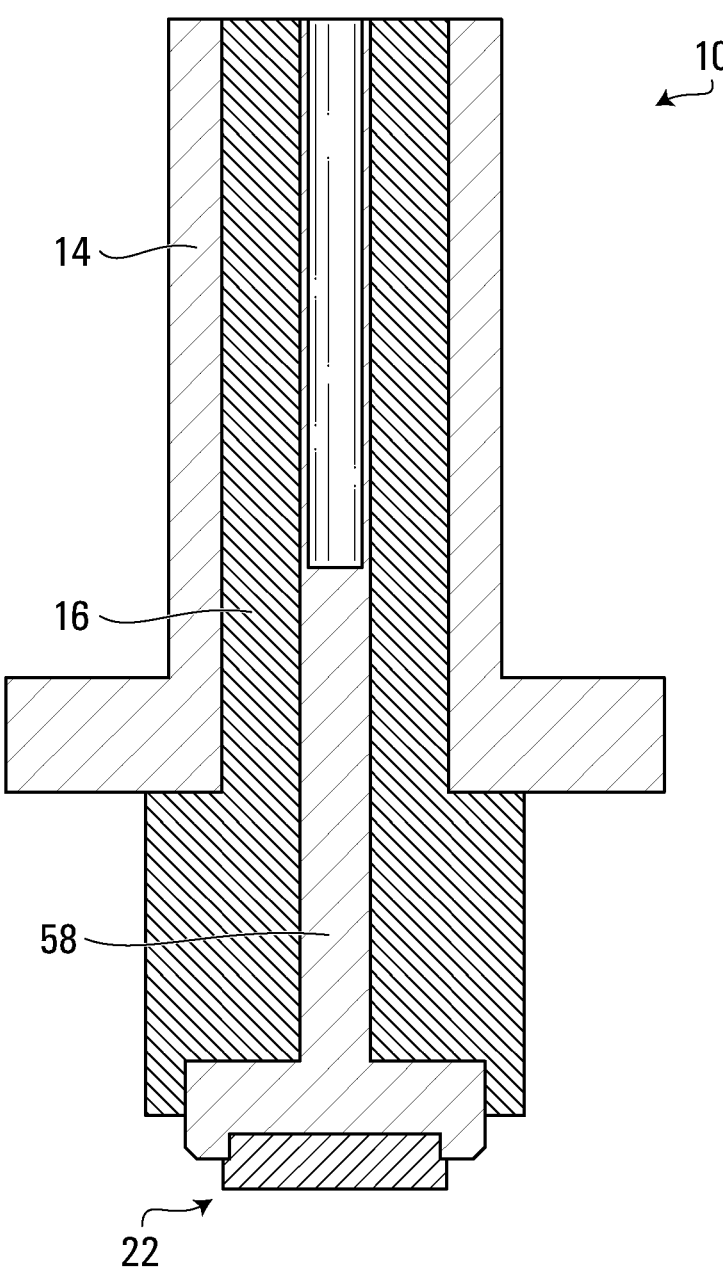
FIG. 13 is a cross-sectional view of a sensor connector according to another embodiment of the present disclosure.
Figure 14:
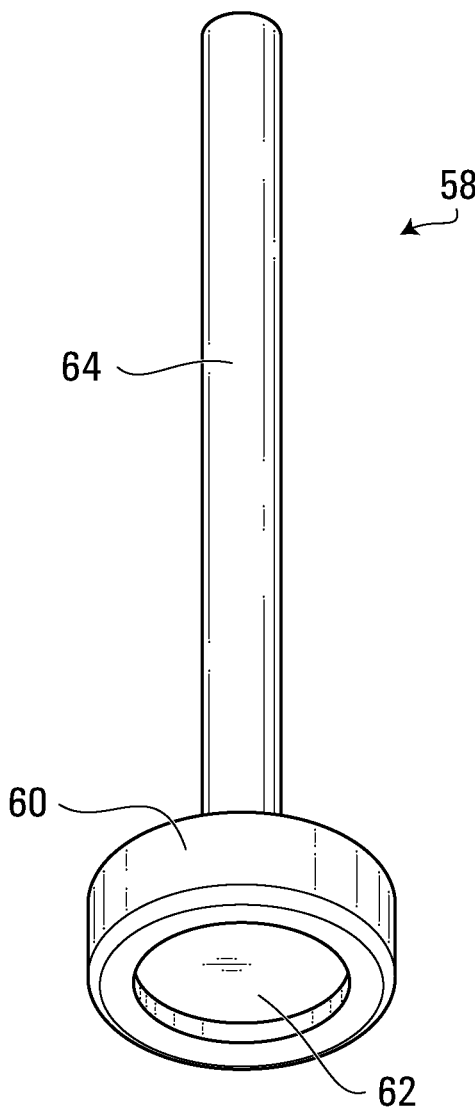
FIG. 14 is a perspective view of the centre conductor of the sensor connector of FIG. 13.

Referring to FIGS. 13 and 14, further embodiments of sensor connectors according to the present disclosure will be described. The illustrated embodiment of the sensor connector 10 includes a centre conductor configured as a plunger 58, as shown in isolation in FIG. 14.

The plunger 58 includes a cylindrical base 60 with a cylindrical cavity 62 for receiving the pad 22 in the manner described above. Namely, cavity 62 may be undersized to receive the pad 22 in a press-fit. For example, a diameter of the cavity 62 may be less than a diameter of the pad 22.

Post 64 extends upwards from the base 60 into and co-axially with insulative sleeve 16. Flanged cylindrical conductive shell 14 coaxially surrounds the sleeve 16 and post 64. A hollow upper portion of the plunger 58 and within the sleeve 16 allows for coupling of a lead. As compared to the earlier described embodiments, the embodiment illustrated in FIG. 13 may omit the use of solder paste 34.

Figure 15:
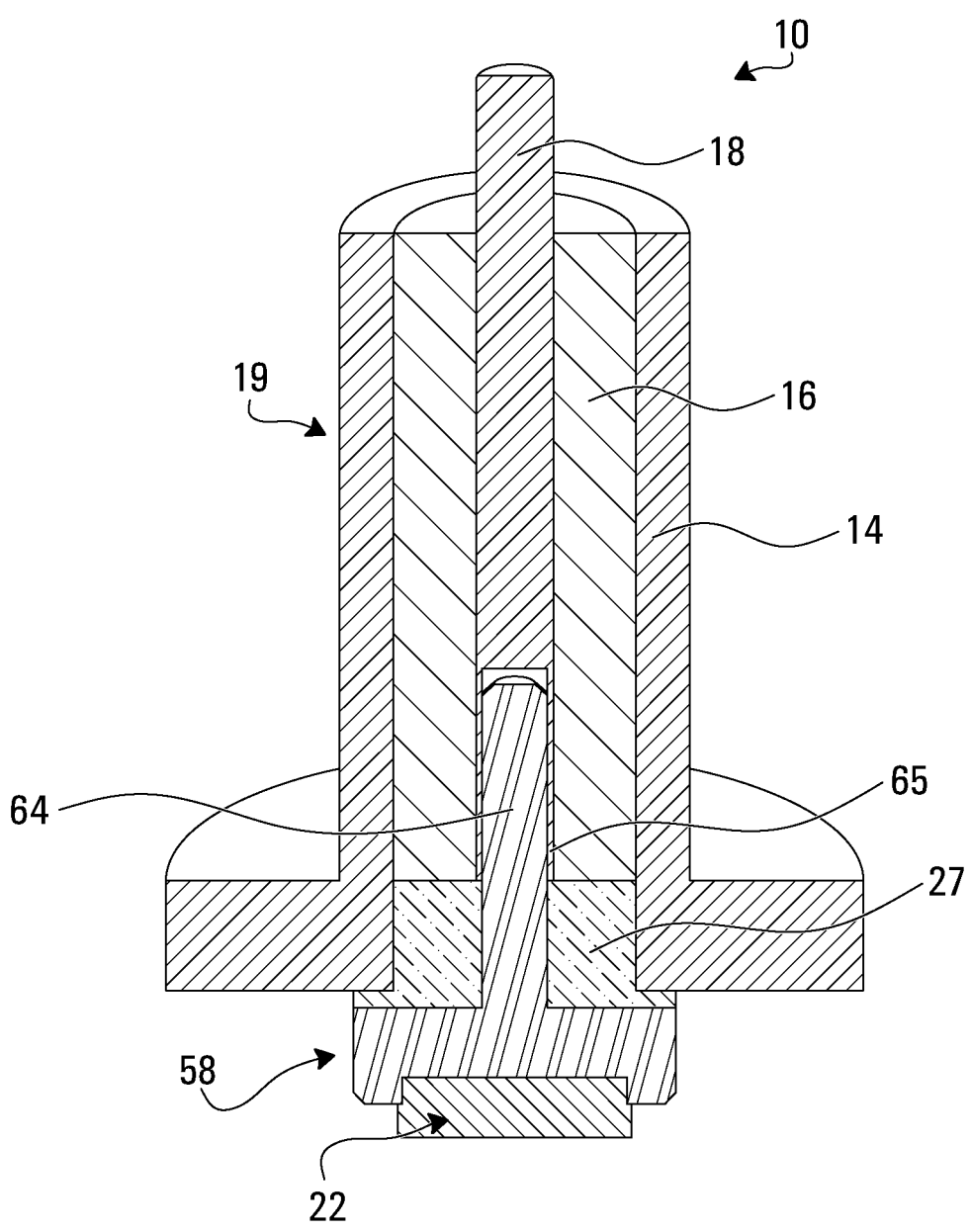
FIG. 15 is a cross-sectional view of a sensor connector according to another embodiment of the present disclosure.

Referring to FIG. 15, in some embodiments, the plunger 58 may itself act as a coupler between an RF connector 19 and the sensing element. In some such embodiments, the post 64 of plunger 58 can be sized and dimensioned such that the post can be press-fitted into the hollow portion 65 (female end) of the centre pin 18 of an RF connector 19 to form a sensor connector 10. The press fit ensures adequate conductive contact between the post 64 (and thus the coupler body) and the centre pin 18. A properly sized and dimensioned insulative sleeve 27 may be used to electrically insulate the plunger 58 from the shell 14 of the RF connector 19, while also possibly providing a stabilization means to keep the plunger in place. The other end of the centre pin 18 may be plain or hollow, recessed or protruded, depending on the intended application.

Figure 16:
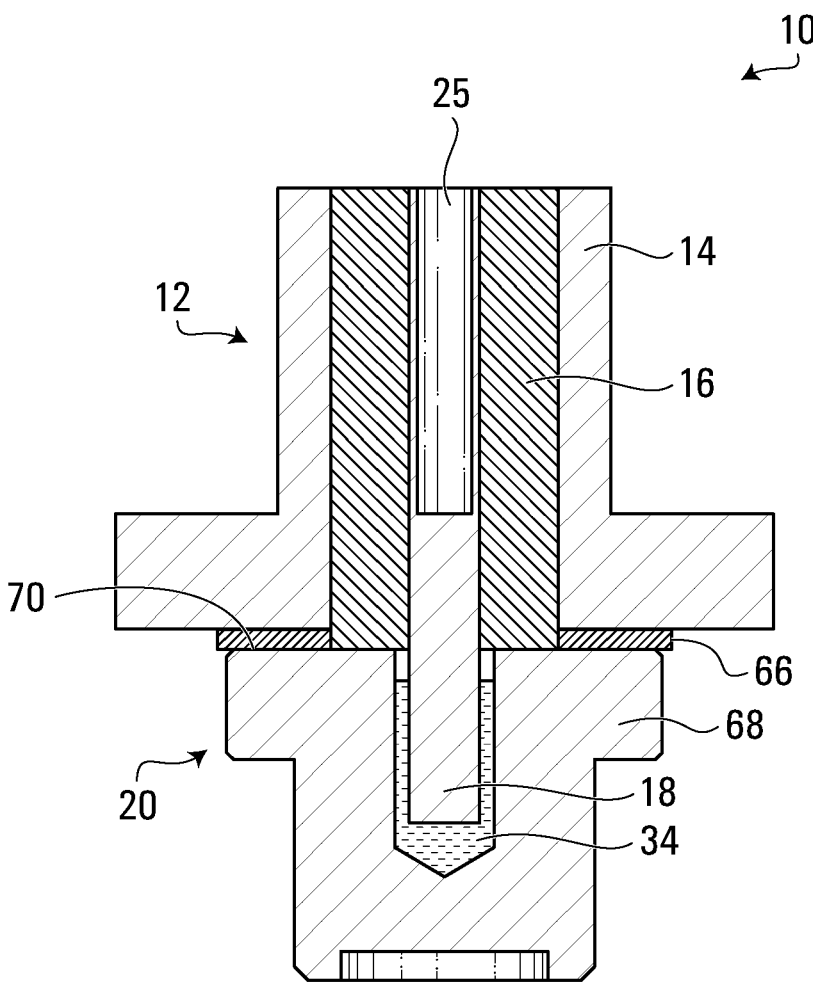
FIG. 16 is a cross-sectional view of a sensor connector according to another embodiment of the present disclosure.

Referring to FIG. 16, a further embodiment of a sensor connector according to the present disclosure will be described. As compared to the above-described embodiments, the embodiment of FIG. 16 includes a thicker insulative sleeve 16 and a ring washer 66 positioned concentrically around the insulative sleeve 16 between the RF connector 12 and coupler 20 to reduce the likelihood that the sensor is damaged during installation. In particular, at the second end 32, the coupler 20 includes a flange portion 68 with a wider diameter than the remainder of the coupler 20, providing a top surface 70 to contact both the insulative sleeve 16 and the ring washer 66. As shown, the ring washer 66 may be sized to have a diameter equal to or larger than the diameter of the flange portion 68.

Other embodiments are possible. For example, the geometries of the components such as the shell, sleeve, conductor, coupler, pad and adaptor may differ from the geometries shown in the illustrated embodiments. The components may have square or rectangular profiles instead of circular. The geometries and configurations of the components may be modified to accommodate conditions in the field and/or the specific assets or ultrasound sensing elements to be connected to without diverting from the principles of the present disclosure.

Numerous specific details have been set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a nonexclusive inclusion. For example, a composition, a process, method, article, or apparatus that comprises a list of elements is not necessarily limited to only those elements but may include other elements not expressly listed or inherently present therein.

As used herein the terms "approximately," "about," "substantially" and variations thereof are intended to include not only the exact value qualified by the term, but to also include some slight deviations therefrom, such as deviations caused by measuring error, manufacturing tolerances, wear and tear on components or structures, stress exerted on structures, and combinations thereof, for example.

Use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Moreover, it will be understood that features of one embodiment may be combined with features of other embodiments, even if not expressly recited or described as a combination.

The invention claimed is:

1. A coupler for coupling a radio frequency (RF) connector to an ultrasound sensing element, the coupler comprising a conductive coupler body with a first end and a second end, wherein the first end comprises a pad retaining recess with a compressible conductive pad positioned in and protruding from the pad retaining recess, and wherein the second end either comprises an opening for receiving a male pin of an RF connector or is shaped to be press-fitted into the female pin opening of an RF connector, to conductively connect the pin with the coupler body.

2. The coupler of claim 1, wherein the pad is press-fitted into the pad retaining recess.

3. The coupler of claim 1, wherein the pad retaining recess is circular and a diameter of the pad retaining recess is smaller than a diameter of the pad.

4. The coupler of claim 1, wherein the coupler body includes a tapered portion that tapers towards the second end.

5. The coupler of claim 1, wherein the second end is configured to contact an insulative sleeve of the RF connector when the pin of the RF connector is inserted into the opening.

6. The coupler of claim 1, wherein the second end comprises a sleeve receiving recess to receive a protruding insulative sleeve of the RF connector when the pin of the RF connector is inserted into the opening.

7. A sensor connector comprising: an RF connector connected to the coupler of claim 1, wherein a pin of the RF connector is conductively connected to the coupler body.

8. The sensor connector of claim 7, wherein a male pin of the RF connector is inserted into and soldered to the coupler body.

9. The sensor connector of claim 8, wherein the pin is soldered to the coupler body using a reflow solder paste.

10. The sensor connector of claim 7, wherein the coupler body has a pin that is press-fit into a female pin opening of the RF connector.

11. A sensor connector for an ultrasound sensor, the connector comprising a conductive shell surrounding an insulative sleeve, and a conductive plunger positioned in the sleeve without conductive contact between the plunger and the shell, the plunger comprising a pad retaining recess with a compressible conductive pad positioned in and protruding from the pad retaining recess.

12. The sensor connector of claim 11, wherein the sleeve protrudes from an end of the shell.

13. The sensor connector of claim 11, wherein the plunger protrudes from an end of the sleeve.

14. The sensor connector of claim 11, wherein the shell comprises a connecting portion extending laterally outward from the shell.

15. The sensor connector of claim 11, wherein the pad is press-fitted into the pad retaining recess.

16. The sensor connector of claim 11, wherein the pad retaining recess is circular and a diameter of the pad retaining recess is smaller than a diameter of the pad.

17. A sensor head comprising: the sensor connector of claim 7, and a conductive adaptor connected to the sensor connector, wherein the adaptor forms a conductive connection with the shell of the sensor connector without a conductive connection with the pad of the sensor connector.

18. The sensor head of claim 17, wherein the adaptor comprises an opening through which the sensor connector extends, the pad being positioned on an opposite side of the opening as a lead to be connected to the sensor connector.

19. The sensor head of claim 17, wherein the adaptor forms an interior cavity, the sensor connector being positioned with the pad in the cavity.

20. The sensor head of claim 19, wherein the cavity is threaded for connection to an asset.

21. The sensor head of claim 17, wherein the adaptor is connected to the sensor connector via an intermediate adaptor sealed to the adaptor.

* * * * *